US012571249B2

(12) United States Patent
Sloan

(10) Patent No.: US 12,571,249 B2
(45) Date of Patent: Mar. 10, 2026

(54) VERTICAL SLATS JOINED TO FORM A FLEXIBLE SLIDING DOOR MOUNTED ON HIDDEN TRACKS

(71) Applicant: William Justin Sloan, Tyler, TX (US)

(72) Inventor: William Justin Sloan, Tyler, TX (US)

( * ) Notice: Subject to any disclaimer, the term of this patent is extended or adjusted under 35 U.S.C. 154(b) by 201 days.

(21) Appl. No.: 18/477,822

(22) Filed: Sep. 29, 2023

(65) Prior Publication Data

US 2025/0109630 A1 Apr. 3, 2025

(51) Int. Cl.
*E06B 9/15* (2006.01)
*E06B 9/11* (2006.01)
*E06B 9/58* (2006.01)

(52) U.S. Cl.
CPC ................ *E06B 9/15* (2013.01); *E06B 9/115* (2013.01); *E06B 9/581* (2013.01); *E06B 2009/1533* (2013.01)

(58) Field of Classification Search
CPC .............. E06B 9/00; E06B 9/115; E06B 9/15; E06B 9/58; E06B 9/581; E06B 2009/1533; E06B 2009/1544; E06B 2009/581; E06B 2009/587; E05D 15/063; E05D 15/0652; E05D 15/0656; E05D 15/12; E05Y 2201/684; A47B 3/04; A47B 47/02; A47B 49/006
USPC ....... 312/297, 199, 307, 318, 332, 349, 260, 312/261, 138.1, 109, 293.1, 293.2, 293.3, 312/133, 291, 292; 160/133, 181, 185, 160/194, 196.1, 197, 198, 199, 200
See application file for complete search history.

(56) References Cited

U.S. PATENT DOCUMENTS 1,251,106 A * 12/1917 Ritter .................... E05D 15/165 312/297
3,645,597 A * 2/1972 Sakow ..................... A47B 3/04 312/282
4,279,454 A * 7/1981 Koiso ...................... E06B 9/115 312/307
5,060,425 A 10/1991 Kappers et al.
5,217,289 A 6/1993 Woodward

FOREIGN PATENT DOCUMENTS

DE 19852545 A1 * 5/2000 ........... A47B 49/006
GB 1011579 A * 12/1965 .............. E06B 9/115

OTHER PUBLICATIONS

English Translation of DE-19852545.*
International Search Report and Written Opinion for International Patent Application No. PCT/US2024/048911 dated Jan. 8, 2025. PDF file. 7 pages.
NPL Ref: NPL01 Type: Pictures on Website Author: Aaron Poritz Title Tambour Island Bar Publication Date: Before Jun. 18, 2023.

(Continued)

*Primary Examiner* — Daniel J Troy
*Assistant Examiner* — Elizabeth Irene Artalejo
(74) *Attorney, Agent, or Firm* — C. Tumey Law Group PLLC

(57) ABSTRACT

A door mechanism that includes a track that includes a lip, and a door mounted on the track that includes a first slat, and a second slat, where the first slat includes a first tab and the second slat includes a second tab, and where the door is mounted on the track using the first tab and the second tab.

20 Claims, 14 Drawing Sheets

(56) References Cited

OTHER PUBLICATIONS

NPL Ref: NPL02 Type: YouTube Video Uploader: My Modern Met Title: Ingenious Furniture Design with Sliding Doors by Poritz & Studio Upload Date: Oct. 7, 2017.

NPL Ref: NPL03 Type: YouTube Video Uploader: Chernysh Brothers Title: TV cabinet with tambour doors Upload Date: Nov. 11, 2020.

NPL Ref: NPL04 Type: YouTube Video Uploader: REHAU Americas Title: Installing a Single Horizontal Tambour Door With Spiral Track Upload Date: Feb. 22, 2012.

NPL Ref: NPL05 Type: YouTube Video Uploader: Michael Alm Title: Patterned Plywood Roll Top Cabinet | How to make Tambour Upload Date: May 2, 2020.

NPL Ref: NPL06 Type: YouTube Video Uploader: DualEx Title: Building a Tambour Door Cabinet During a Blizzard | RV Renovation Ep. 6 Upload Date: Jan. 28, 2022.

* cited by examiner

VERTICAL SLATS JOINED TO FORM A FLEXIBLE SLIDING DOOR MOUNTED ON HIDDEN TRACKS

BACKGROUND

Devices are often capable of performing certain functionalities that other devices are not configured to perform or are not capable of performing. In such scenarios, it may be desirable to adapt one or more systems to enhance the functionalities of devices that cannot perform those functionalities.

BRIEF DESCRIPTION OF DRAWINGS

These drawings illustrate certain aspects of some examples of the present disclosure and should not be used to limit or define the disclosure.

DETAILED DESCRIPTION

Overview and Advantages

Figure 1A:
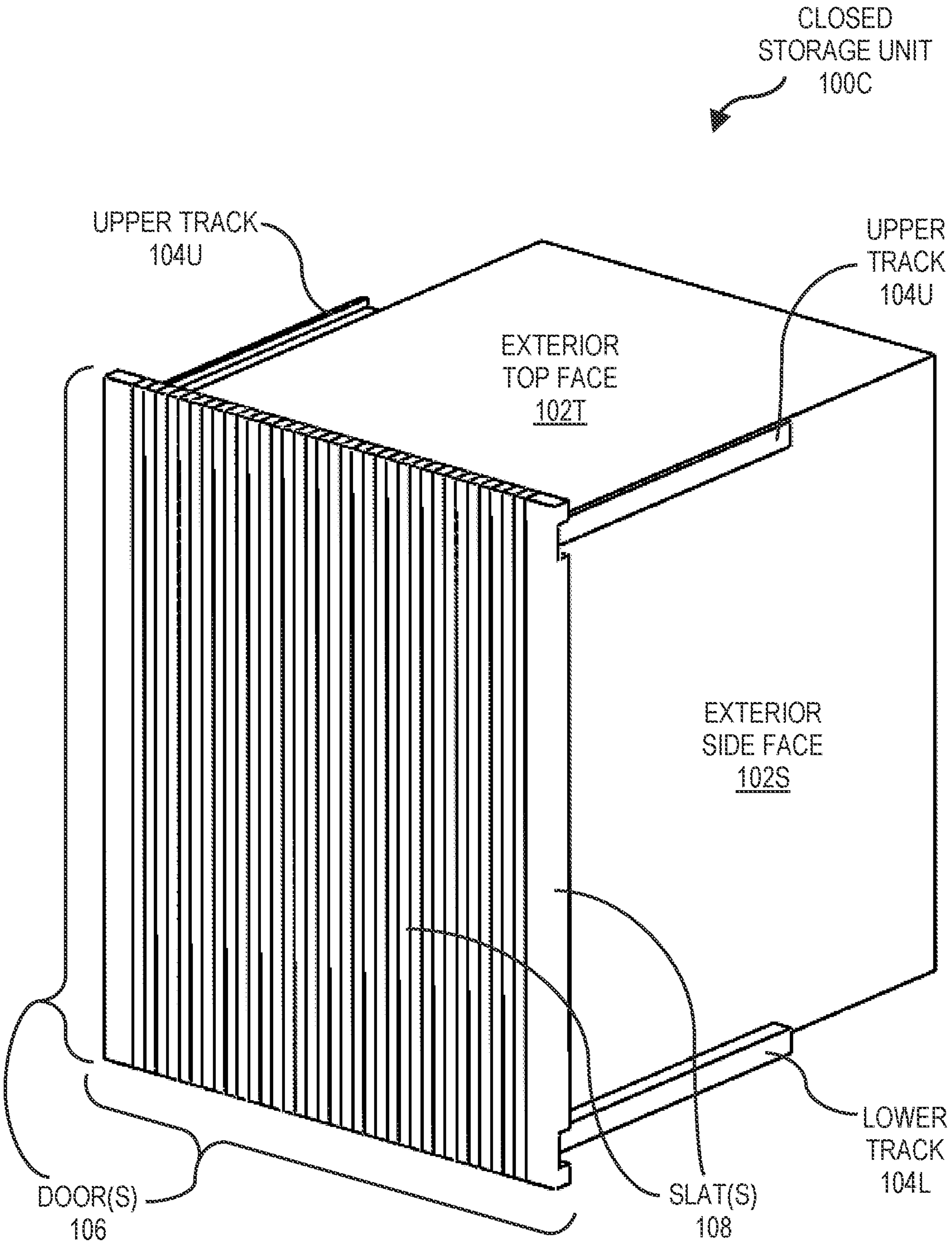
FIG. 1A is a diagram of a closed storage unit.

In general, this application discloses one or more embodiments of systems for flexible doors mounted on hidden tracks. When closed, the flexible doors described herein allow the contents of a storage unit, the tracks, and the outside of the storage unit to be obscured from view. Further, when opened, the flexible doors allow for unobstructed access to the storage unit without the door protruding outward.

In conventional cabinetry, doors are made from panels that are hinged to swing open and closed. If the doors are made of opaque materials, the contents of the cabinets cannot be viewed without opening the cabinet doors. Thus, if a user desires visibility of the cabinets' contents, the cabinet doors must remain open. However, when the doors are open, the doors protrude into the living space around the cabinets. Such an arrangement is not ideal when living space is limited, as the volume surrounding the cabinets is invaded, and pathways are obstructed. Further, open cabinet doors create hazardous obstacles, potentially causing injury when unexpectedly contacted (e.g., head injuries on upper cabinet doors, leg/knee injuries on base cabinet doors, etc.).

One potential workaround is to have cabinet doors made (at least partially) from a transparent material (e.g., glass), or to remove the cabinet doors entirely. However, such solutions have downsides. With glass doors (or no doors) the contents of the cabinets cannot be hidden from view. That is, with opaque doors, the user has the choice of visible contents (when opened) or hidden contents (when closed). But, with transparent doors (or no doors), there is no such choice.

Another potential solution is to use a hinge-less tambour door. Similar to a rolltop desk (turned on its side), individual slats of wood may be flexibly joined to form a larger door, where the top and bottom are inserted in opposing grooves allowing for the door to slide open and close. The grooves may be placed such that, when open, the door coils into a volume inside the cabinet. Thus, when the door is "open", the door does not invade the surrounding space (reducing the chance of unintentional contact).

However, conventional tambour doors have multiple drawbacks. The top and bottom of the slats are inserted in the grooves which are inset into the cabinets—consuming peripheral space of the cabinet. Further, the front edges of the cabinet's top and bottom surfaces remain visible, providing a 'functional' aesthetic that may not be desirable (or easily concealed). The lower groove may collect debris—causing the door to jam—and therefore requires regular inspection and maintenance to remove unwanted particles. A considerable volume inside the cabinet must be reserved to store the tambour door (when opened). For sufficiently smooth motion of the door, the radius of the grooves' bends must be large enough to accommodate the widest inserted slat. Consequently, tambour doors require either (i) grooves with large radius bends (leaving the corners of the cabinet unusable), or (ii) to allow for smaller radius bends, inserted slats must be made thinner and in greater quantity (increasing manufacturing complexity, time, and cost).

As disclosed in one or more embodiments herein, a hinge-less flexible door is described, made from one or more slats, that rides on a track mounted externally to a storage box. That is, unlike a conventional tambour door, the slats are not inserted in grooves and are therefore not constrained by the geometry of such grooves. Instead, the back of each slat includes a cutout with a protruding tab that rides on the externally mounted track. As the track is external to the storage box, the door does not consume any of the usable volume of the storage unit—when opened or closed. Such a design allows for the track to have smaller radius bends (e.g., allowing for tighter turns) without necessitating a reduction in the width of the slats. Further, as the slats are not inserted in grooves, the slats may be made arbitrarily tall to extend above and below the storage box. Thus, when closed, the door may be the only visible portion of the storage unit, providing a cleaner, more polished aesthetic.

Additionally, the individual components of a system (disclosed in one or more embodiment(s) herein) may be fabricated to ease assembly of the larger system. As a non-limiting example, each standard slat may be made in a shape that is similar to each other standard slat. Thus, when assembling a hinge-less flexible door, the specific order of individual standard slats is irrelevant, allowing for the interchangeability of any standard slat with any other standard slat. As another non-limiting example, tracks (and/or smaller components of the tracks) may be formed to have geometric similarity with other tracks (and/or smaller components of the tracks). Thus, a track installed on the front of the storage unit may be similar to a track installed on either, or both, sides of the storage unit. Similarly, any track installed on an upper portion of a storage unit may be geometrically similar to a track installed on a lower portion of a storage unit (albeit affixed in a different orientation).

To further ease assembly, individual components may be oriented in several "correct" positions. That is, components may be formed to have geometric symmetry across one or more plane(s) (e.g., mirrored over one or more center line(s)). As disclosed herein, a standard slat may be fabricated to have an "upside" that is mirrored to a "downside", such that an inverted (e.g., "upside down") standard slat is geometrically similar to a standard slat which is oriented "right side up" (more precisely, "correct side up" or "upside up"). Consequently, standard slats may be installed "upside down" without consequence (as either end may be accurately described as the "upside"). Therefore, proper assembly of the system may be made easier as (i) several components may be interchangeable with similarly shaped components, and (ii) individual components may be rotated to multiple "correct" orientations.

Accordingly, as disclosed herein, a storage unit is described which, when opened, allows for the contents of the storage unit to be viewed-without the door protruding outwards into the surrounding livable space. And, when closed, the door may completely cover the front-side of the storage unit providing a more desirable and visually pleasing aesthetic. Further, regardless of position (opened or closed), the door does not consume any of the internal usable volume of the storage unit as an external track system is used to mount the flexible door. Such a system may be added to a storage unit of any size (e.g., cabinetry made to standard sizes, cabinetry made to custom sizes, a floor-to-ceiling wardrobe, etc.) and may be retroactively added to replace existing doors.

FIGS. 1A-C

Figure 1B:
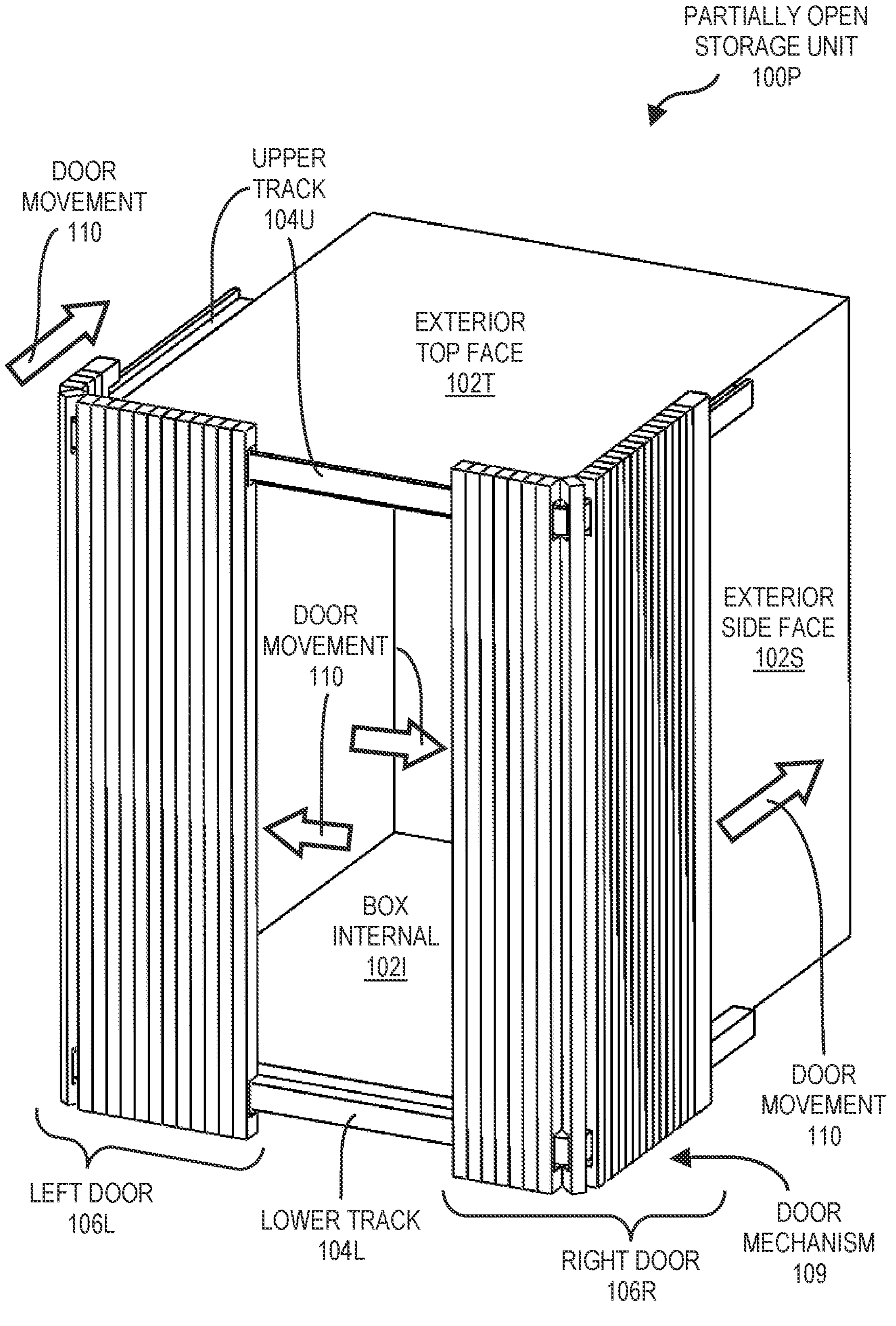
FIG. 1B is a diagram of a partially open storage unit.
Figure 1C:
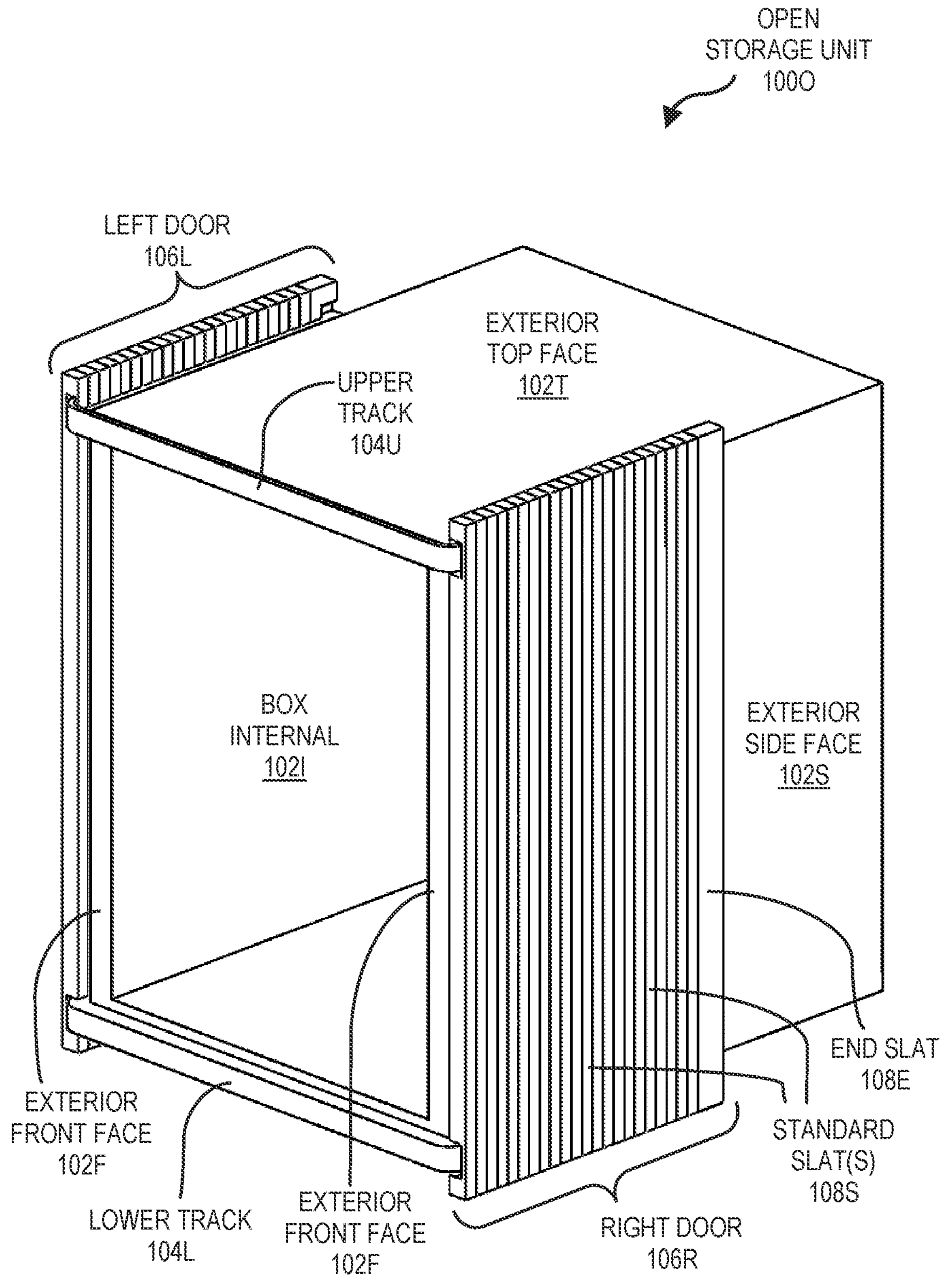
FIG. 1C is a diagram of an open storage unit.

FIG. 1A is a diagram of a closed storage unit. FIG. 1B is a diagram of a partially open storage unit. FIG. 1C is a diagram of an open storage unit.

Storage unit 100, generally, is a container constructed to store one or more physical object(s) (not shown). Storage unit 100 may include box 102, one or more track(s) 104, and one or more door(s) 106. To place physical objects in storage unit 100, there may be an opening on one or more side(s) of box 102 that allows for those objects to be placed in box internal 102I. One or more door(s) 106 may be used to close or open storage unit 100 (e.g., by blocking or not blocking the opening, respectively). Non-limiting examples of storage unit 100 include a cabinet, dresser, wardrobe, and closet.

Closed storage unit 100C (see FIG. 1A) is a storage unit 100 where an opening is largely obstructed by one or more door(s) 106, thereby preventing physical objects from being added or removed. Partially open storage unit 100P (see FIG. 1B) is a storage unit 100 where an opening is partly obstructed by one or more door(s) 106. As a non-limiting example, door(s) 106 may partially block an opening of storage unit 100 when door(s) 106 are in motion (experiencing door movement 110). Open storage unit 1000 (see FIG. 1C) is a storage unit 100 where an opening of storage unit 100 is largely unobstructed by one or more door(s) 106, thereby allowing physical objects to be added or removed from box internal 102I.

Box 102 is a main body of storage unit 100 that forms the cavity in which objects may be placed. Box 102 may be constructed from any suitable material including, but not limited to, wood, plastic, metal, drywall, and/or any combination thereof (e.g., a composite material). Box 102 may be in any suitable shape for the desired application (e.g., uniform rectangular area over depth for standard cabinetry, rounded corners for style and/or accessibility, etc.). A height of box 102 (i.e., the vertical length as depicted in FIGS. 1A, 1B, and 1C) may be referred to as a "box height".

Various exterior surfaces of box 102 may be referred to according to the direction the surface may be viewed most directly. Exterior front face 102F is the face of box 102 with an opening (exposing box internal 102I). Exterior top face 102T is the top surface of box 102. Exterior side face(s) 102S are the faces of box 102 with tracks 104 partially spanning the depth (i.e., with edges shared by exterior front face 102F and exterior top face 102T). Box internal 102I is the combination of surfaces and/or faces of box 102 that form the concave inside of box 102. An object, stored in storage unit 100 is stored in box internal 102I.

Track 104 is a structure, affixed to box 102, which allows for door(s) 106 to undergo door movement 110. Additional details of track 104 may be found in the description of FIGS. 3A and 3B.

Door 106 is a structure which is slidably affixed to box 102 via one or more track(s) 104. Door 106 is constructed using one or more slat(s) 108. Slats 108 may be joined together via some flexible material (e.g., fabric/cloth, paper, elastic, etc.) (not shown) to allow for flexible, pivoting, and/or bending movement of door 106. Door 106, on closed storage unit 100C (see FIG. 1A), may be considered to be in a "closed position". Door 106, on open storage unit 1000 (see FIG. 1C), may be considered to be in an "open position".

Left door 106L is a door 106 installed on the left side of storage unit 100 (when viewed from the side of storage unit 100 on which door 106 is installed). Right door 106R is a door 106 installed on the right side of storage unit 100 (when viewed from the side of storage unit 100 on which door 106 is installed). Although two doors 106 (left door 106L and right door 106R) are shown in the examples of FIGS. 1B and 1C, a person of ordinary skill in the relevant art, provided the benefit of this detailed description, would understand that a single door 106 may be installed on storage unit 100.

Slat 108 is a narrow structure used to form door 106, alone or in combination with one or more other slat(s) 108. Additional details of slat 108 may be found in the description of FIGS. 2A, 2B, 2C, and 2D.

Door movement 110 is the motion of door 106 along track 104. Depending on the bend(s) 317 of track 104, door 106 may bend and change direction during door movement 110. As shown in the examples of FIGS. 1A-C, tracks 104 curve around and line the exterior front face and (at least part of) both exterior side faces of box 102. Thus, doors 106 may traverse along the front and (part of) both sides of box 102 during door movement 110. Door movement 110 may be caused by exerting lateral force onto door 106. As a non-limiting example, a human may exert lateral forces onto the door by pushing either side of door 106 and/or grabbing and sliding a handle attached to door 106.

Door mechanism 109 is any combination of one or more track(s) 104 and one or more door(s) 106.

FIGS. 2A-E

Figure 2A:
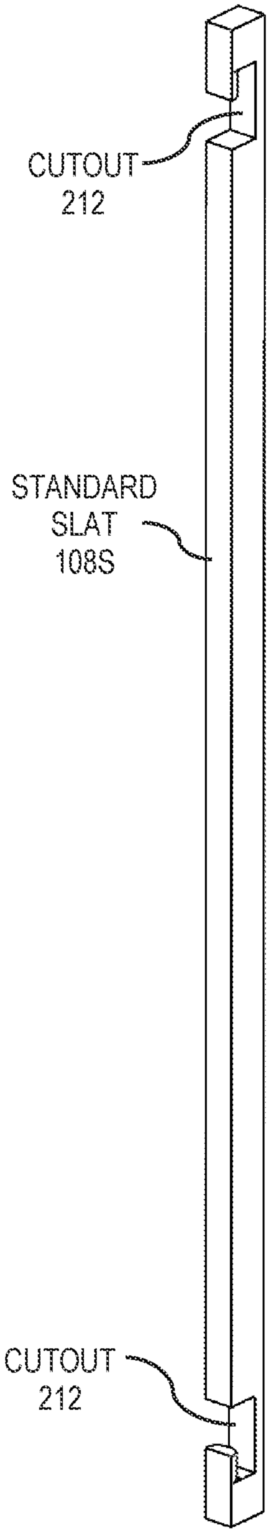
FIG. 2A is a diagram of a standard slat.
Figure 2B:
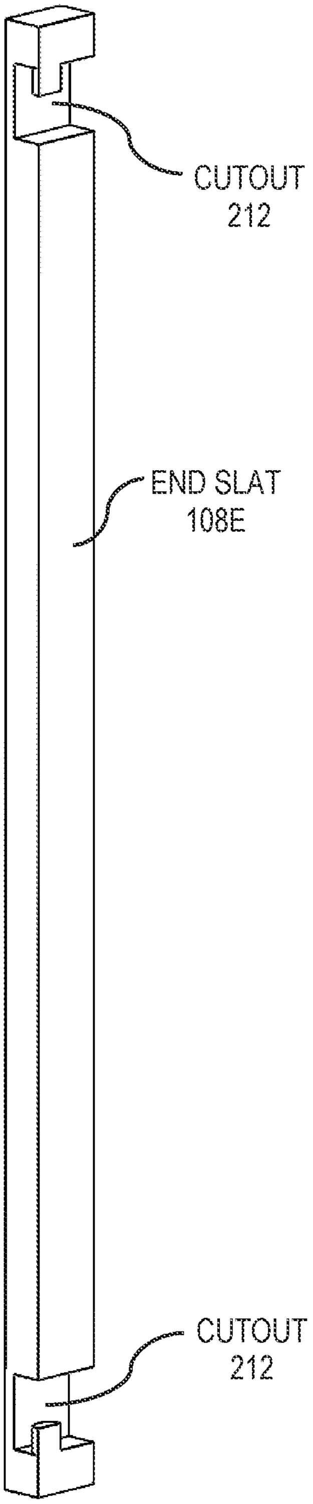
FIG. 2B is a diagram of an end slat.
Figure 2C:
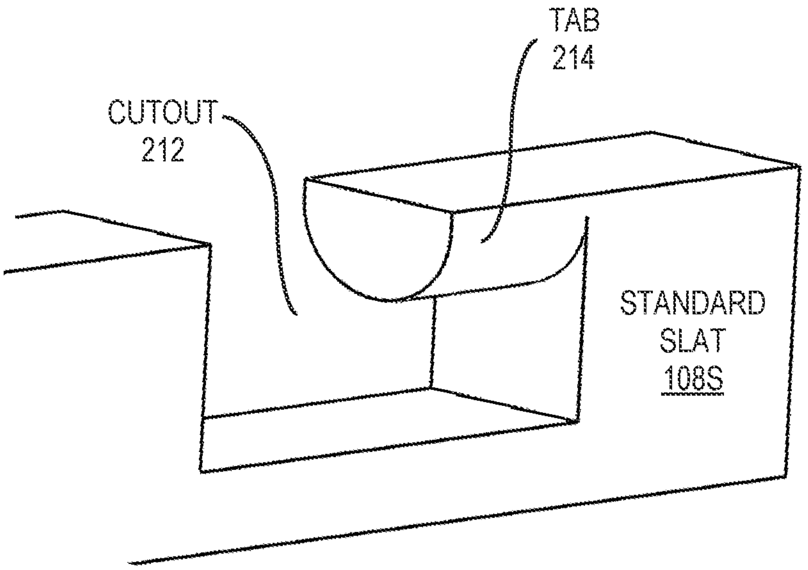
FIG. 2C is a diagram of a cutout on a standard slat.
Figure 2D:
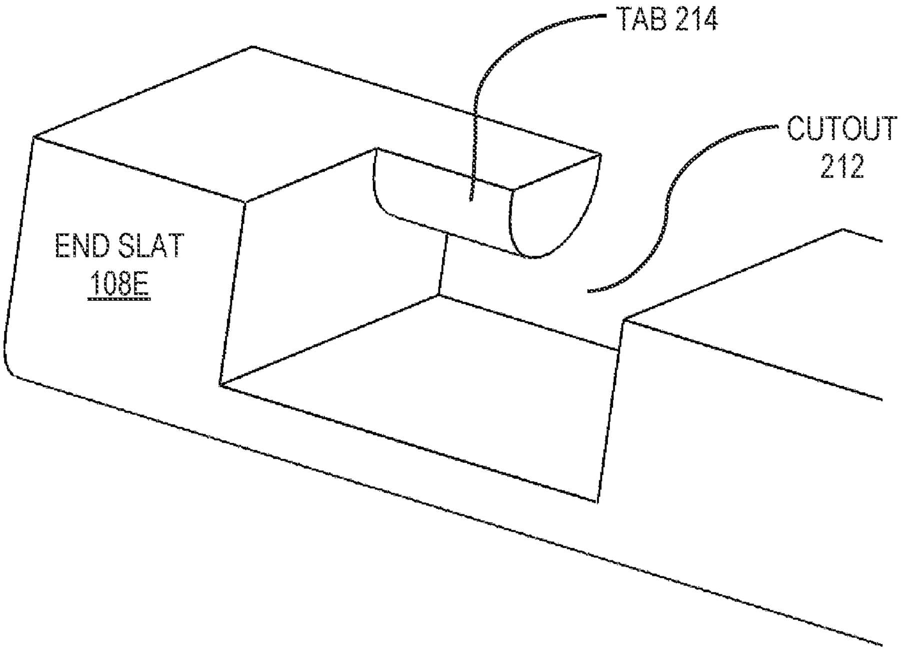
FIG. 2D is a diagram of a cutout on an end slat.
Figure 2E:
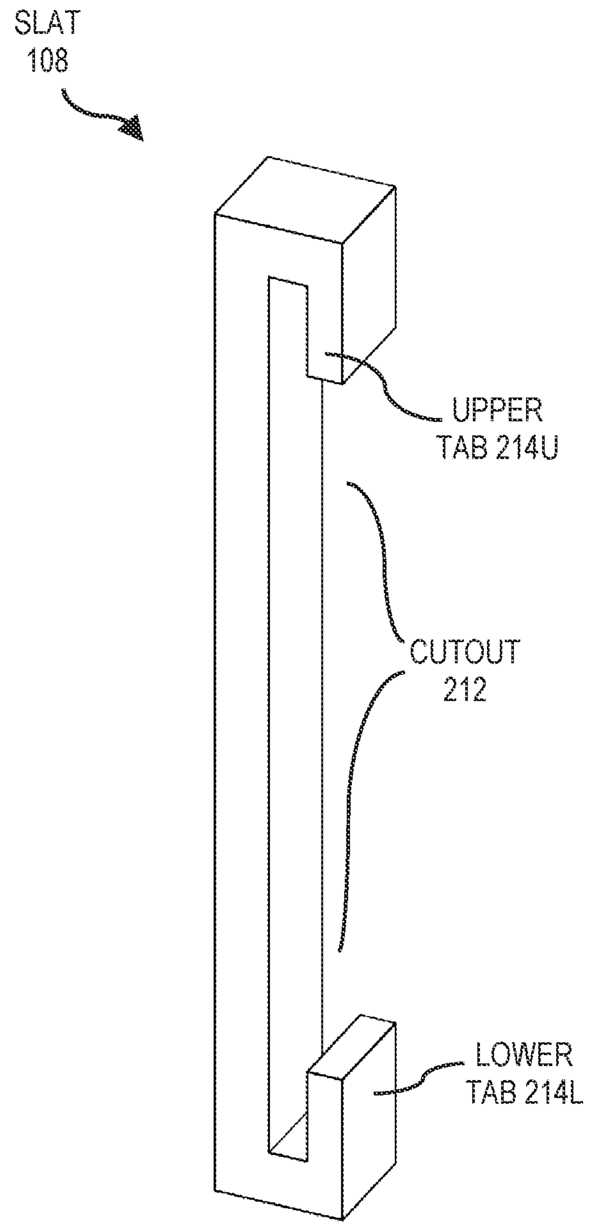
FIG. 2E is a diagram of an example slat.

FIG. 2A is a diagram of a standard slat. FIG. 2B is a diagram of an end slat. FIG. 2C is a diagram of a cutout on a standard slat. FIG. 2D is a diagram of a cutout on an end slat. FIG. 2E is a diagram of an example slat.

Slat 108 is a narrow structure used to form door 106, alone or in combination with one or more other slat(s) 108. Slat 108 may be constructed from any suitable material including, but not limited to, wood, plastic, metal, and/or any combination thereof (e.g., a composite material). Slat 108 may include one or more cutout(s) 212 disposed at one (or both) distal ends of slat 108. A height of slat 108 (i.e., the length along its longest dimension, the vertical length as depicted in FIGS. 2A and 2B) may be referred to as a “slat height”.

Standard slat 108S is a slat 108 which may be used to construct any section of door 106. End slat 108E is a slat 108 which may be used to construct a lateral end of door 106 (e.g., a slat 108 that is disposed at a most extreme side of door 106).

As shown in FIG. 2A, standard slat 108S may be fabricated symmetrical in two (of its three) dimensions. Accordingly, standard slat 108S may be installed with either distal end in the ‘upper’ (or ‘lower’) position, as both ends are constructed with similar geometry.

As shown in FIG. 2B, end slat 108E may function as an end slat on either lateral end of door 106. As oriented in FIG. 2B, end slat 108E would function as an end slat for left door 106L. However, if inverted over its longest dimension (i.e., rotated “upside down”), the same end slat 108E would function as an end slat for right door 106R. Thus, only a single form of end slat 108E needs to be manufactured, where end slat 108E may be inverted to function as the end slat for either side of door 106. End slat 108E may further have a rounded (e.g., filleted) edge along its longest dimension between the front face and the exposed side. The rounded edge may allow for easier door movement 110 of end slat 108E when installed within close proximity to an adjacent end slat 108E on another closed storage unit 100C (e.g., see FIGS. 5A and 5B).

Cutout 212 is a concave volume in slat 108, absent the material used to construct slat 108. Cutout 212 may be shaped to complement the geometry of track 104. Accordingly, the dimensions of cutout 212 may be larger than the respective dimensions of track 104, such that track 104 may fit within cutout 212. Upper cutout 212U is a cutout 212 which is installed on upper track 104U. Lower cutout 212L is a cutout 212 which is installed on lower track 104L.

Tab 214 is a protrusion of slat 108 extending into cutout 212. Tab 214 may be shaped to complement the geometry of lip 316 (on track 104), thereby restricting the movement of slat 108 (as a whole) away from track 104. As shown in FIGS. 2C and 2D, tab 214 may have a rounded outward-facing surface (i.e., the side facing away from box 102) to allow for easier door movement 110 around bend 317 of track 104. Upper tab 214U is a tab 214 disposed in upper cutout 212U. In one or more embodiments, the underside of upper tab 214U may rest (and slide) along the topside of upper rail 318U. Lower tab 214L is a tab 214 disposed in lower cutout 212L.

As shown in FIG. 2E, an example slat 108 is depicted with a single cutout 212. In the example of FIG. 2E, cutout 212 extends across the middle portion of slat 108 up to upper tab 214U and down to lower tab 214L.

FIGS. 3A-C

Figure 3A:
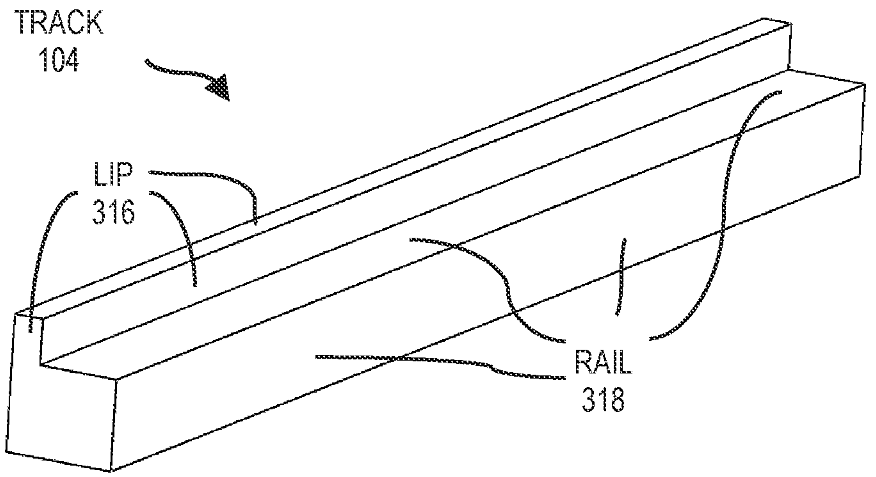
FIG. 3A is a diagram of a track section.
Figure 3B:
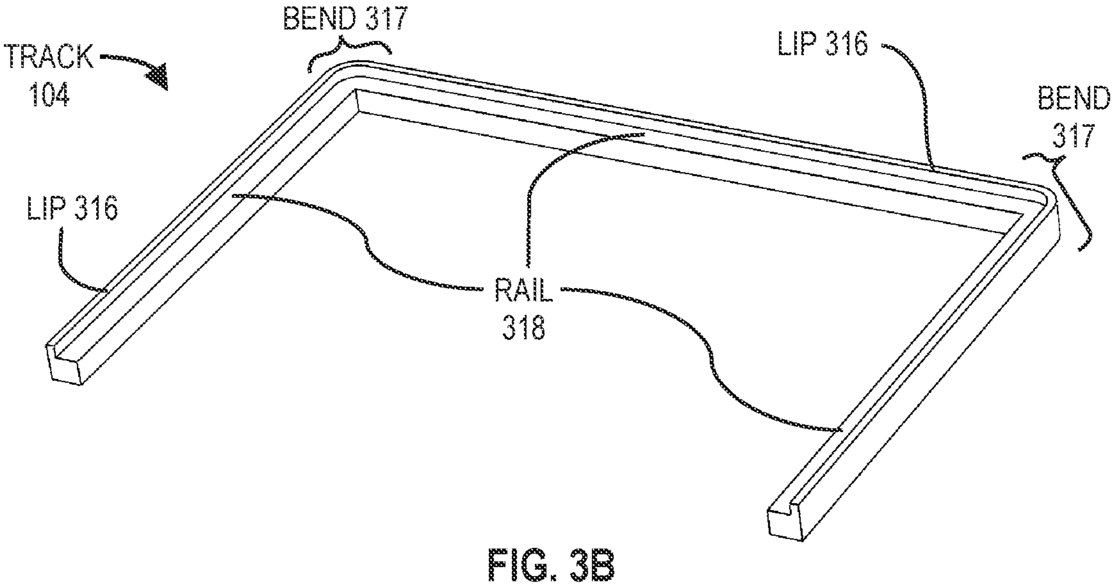
FIG. 3B is a diagram of a track with bends.
Figure 3C:
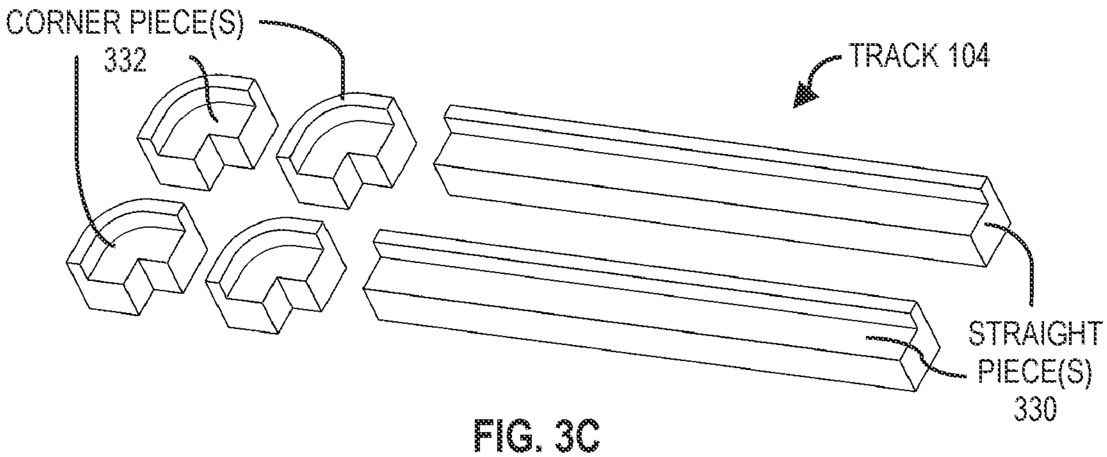
FIG. 3C is a diagram of a track broken into smaller components.

FIG. 3A is a diagram of a track section. FIG. 3B is a diagram of a track with bends. FIG. 3C is a diagram of a track broken into smaller components.

Track 104 is a structure which allows for door(s) 106 (and the slat(s) 108 thereof) to undergo door movement 110. Track 104 may be constructed from any suitable material including, but not limited to, wood, plastic, metal, and/or any combination thereof (e.g., a composite material). The portions of track 104 which contact slat 108 may be smooth (e.g., made of smooth materials, made smooth by process, etc.) to reduce friction between track 104 and slat 108. Track 104 may be shaped (i.e., have a geometry) that interlocks with one or more slat(s) 108 to prevent slat(s) 108 from detaching outwardly away from track 104. Track 104 may be affixed to box 102 via any suitable means (e.g., screws, nails, glue, tape, magnets, etc.). Track 104 may include rail 318 and lip 316.

Track 104 may include bend(s) 317 which allow for slat(s) 108 (and door(s) 106) to change direction when undergoing door movement 110. Due to the geometry of slat 108 and track 104, the radius of bend(s) 317 may be made arbitrarily small, provided that the width of tab 214 (and/or depth of cutout 212) is constructed to allow for slat 108 to traverse bend 317 (when undergoing door movement 110).

Upper track 104U is a track 104 installed on the upper portion of box 102 (e.g., disposed vertically above lower track 104L). Lower track 104L is a track 104 installed on the lower portion of box 102 (e.g., disposed vertically below upper track 104U).

Lip 316 is a structure of track 104 that protrudes from the main body of track 104. Lip 316 may be shaped to interlock with tab 214 such that lip 316 and tab 214 prevent movement of slat 108 away from track 104 (and box 102). Upper lip 316U is a structure of upper track 104U. As shown in the example figures, upper lip 316U protrudes upwards when disposed on upper track 104U. Lower lip 316L is a structure of lower track 104L. As shown in the example figures, lower lip 316L protrudes downwards when disposed on lower track 104L.

Rail 318 is a structure that comprises the main body of track 104. Tab 214 (of slat 108) may contact and slide along one or more surface(s) of rail 318 during door movement 110. Upper rail 318U is a structure of upper track 104U. Upper tab 214U may contact and slide on upper rail 318U. Lower rail 318L is a structure of lower track 104L.

In FIG. 3B, an example track 104 is shown which may be fabricated for installation on box 102. That is, track 104 may be manufactured as a single piece and sized to fit the known dimensions of box 102.

In FIG. 3C, an example track 104 is shown which may be fabricated, in pieces, for assembly onto box 102. Track 104 may be assembled from straight piece(s) 330 and corner piece(s) 332 on a box of any size, and track 104 does not need to be manufactured to the known dimensions of box 102. As a non-limiting example, straight piece(s) 330 may be fabricated in various lengths, which may be cut-to-size by an end user and installed on box 102. Further, corner piece(s) 332 may be manufactured at various inside angles (e.g., 45°, 70°, 90° (shown), 120°, etc.) to accommodate different bend(s) 317 needed for various shapes of box 102 (e.g., a regular hexagonal box would require corner piece(s) 332 with 120° angles).

Generally, door(s) 106 (and the slat(s) 108 thereof) may be installed on track(s) 104 by loading slat(s) 108 onto track(s) 104 in the directions of door movement 110. That is, during assembly, one (or both) ends of track(s) 104 may be open, allowing slat(s) 108 to slide freely on (and off) the track(s) 104 for installation. After installation, the ends of track(s) 104 may be modified to prevent door(s) 106 from being removed (e.g., adding a cap and/or stop to the ends of tracks 104).

FIGS. 4A-F

Figure 4A:
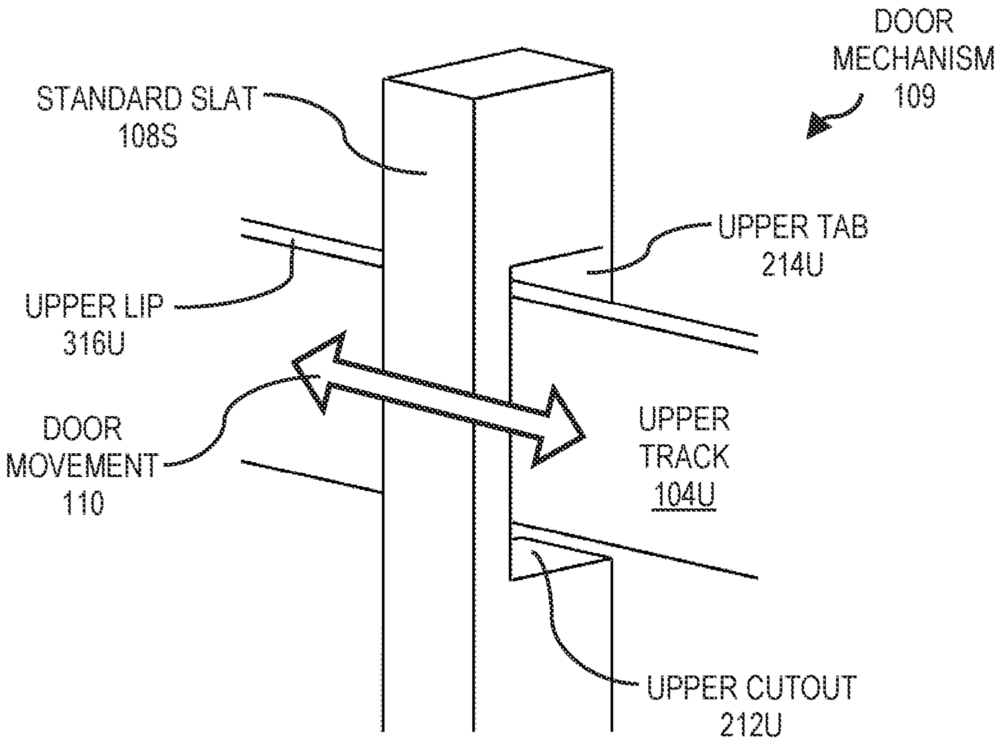
FIG. 4A is a diagram of a slat on a track, viewed from the front perspective.
Figure 4B:
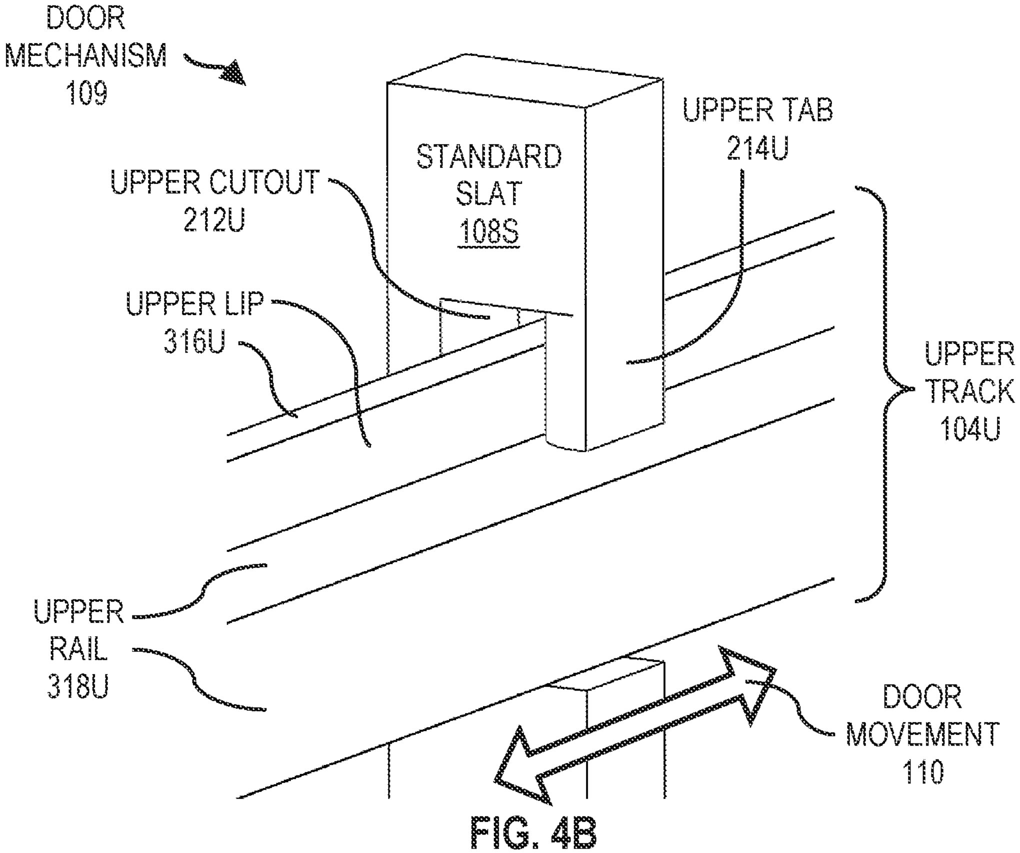
FIG. 4B is a diagram of a slat on a track, viewed from a back perspective.
Figure 4C:
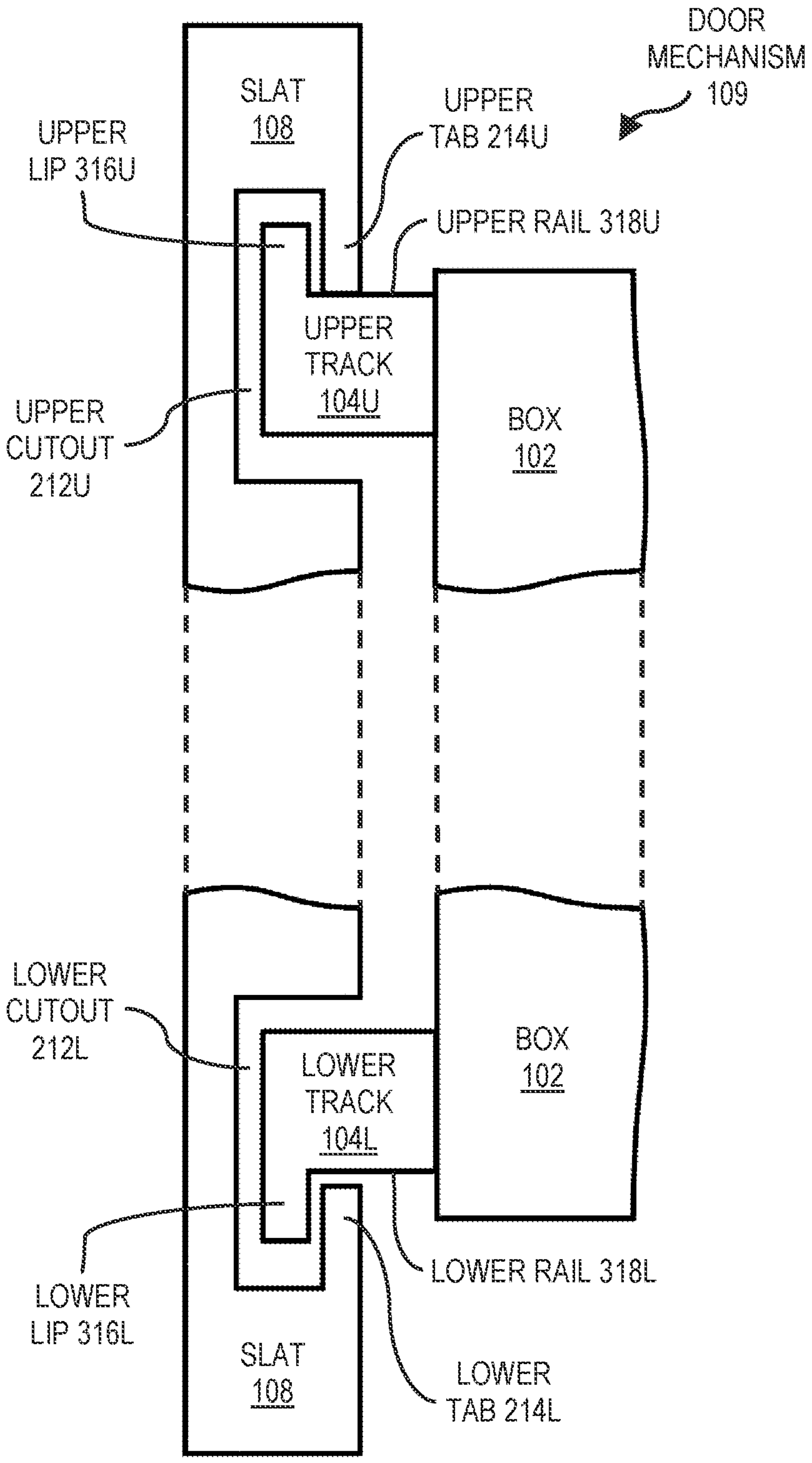
FIG. 4C is a diagram of a slat on a track, viewed from a side.
Figure 4D:
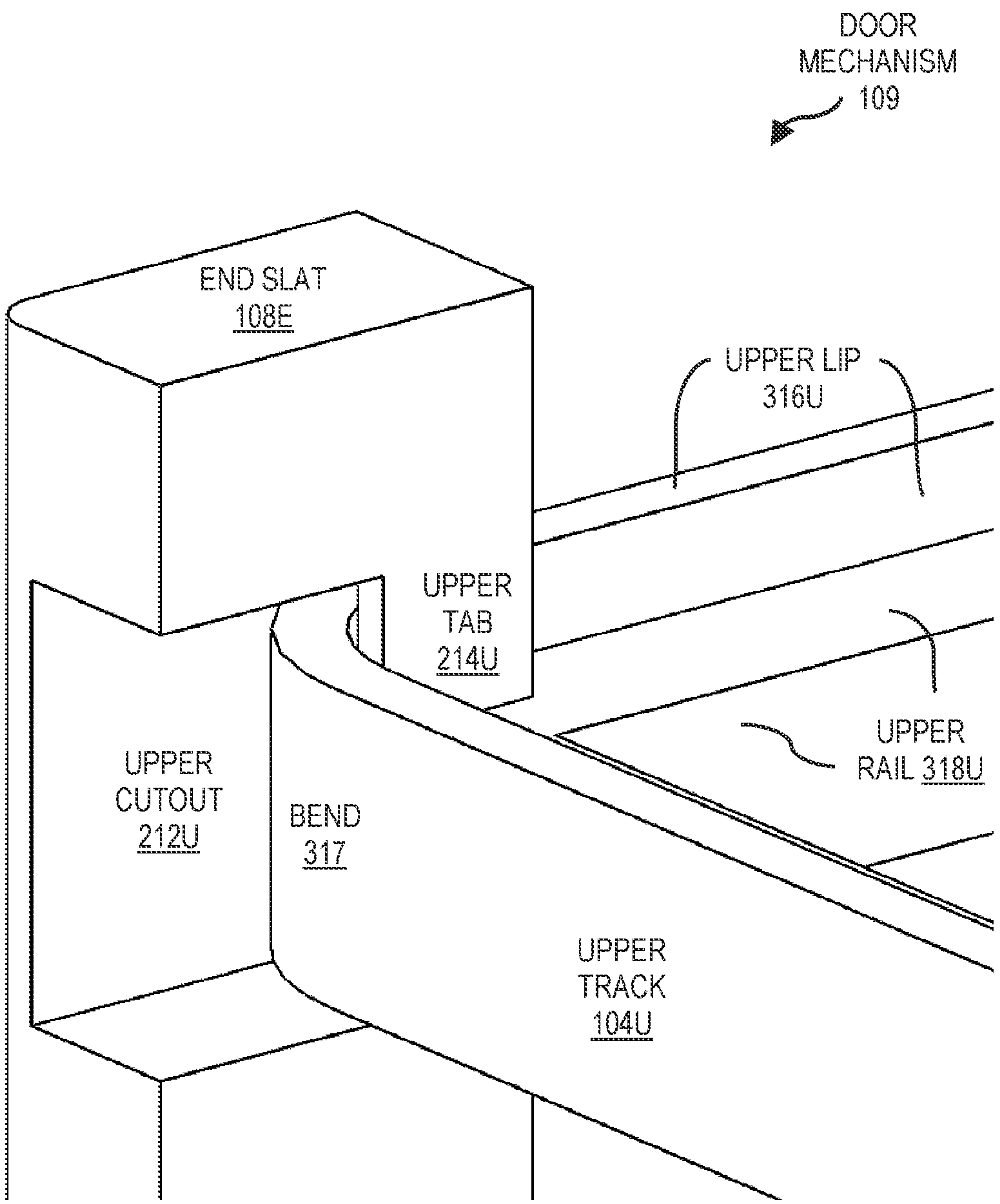
FIG. 4D is a diagram of an end slat at a bend of a track.
Figure 4E:
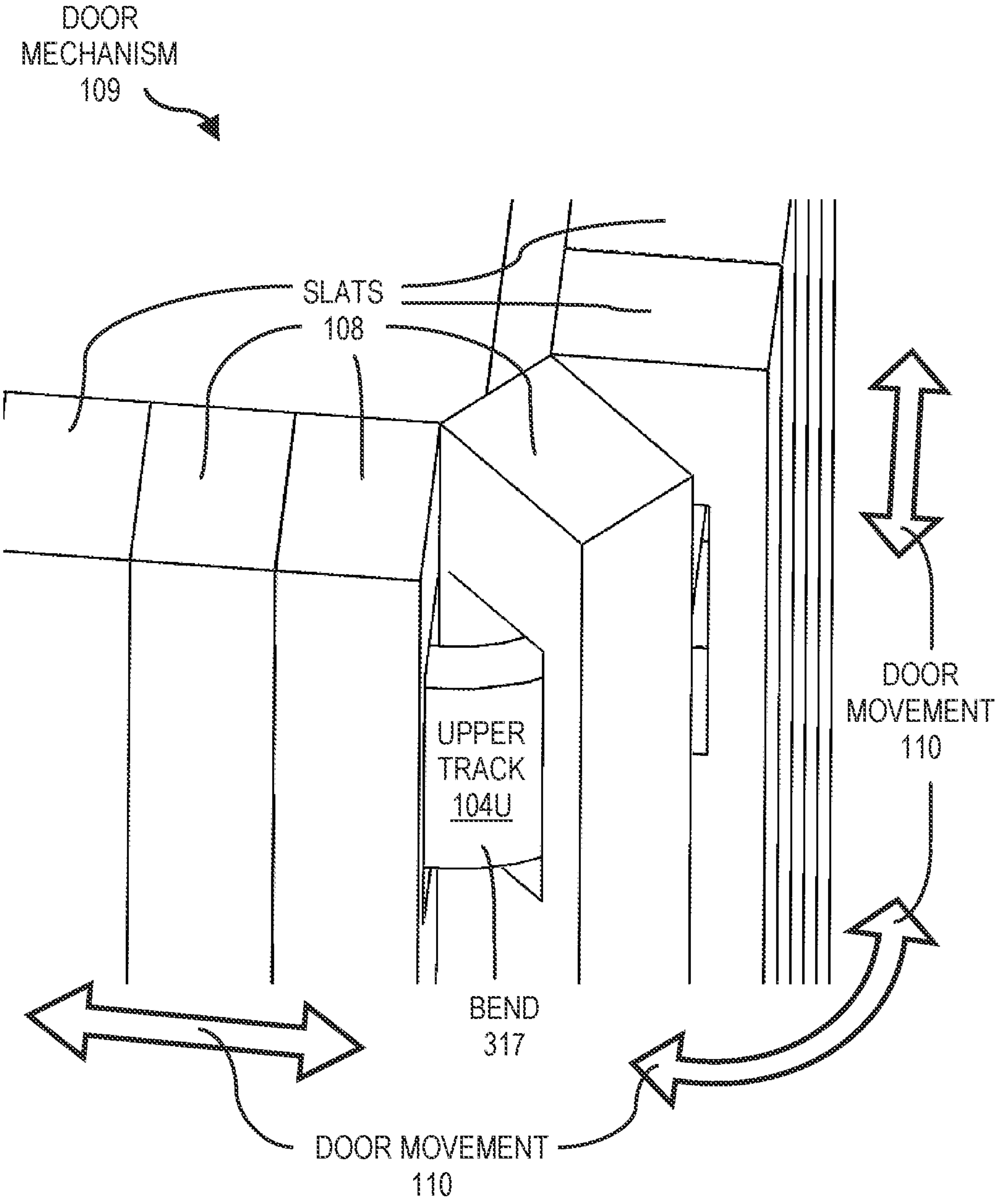
FIG. 4E is a diagram of multiple slats moving around a bend of a track.
Figure 4F:
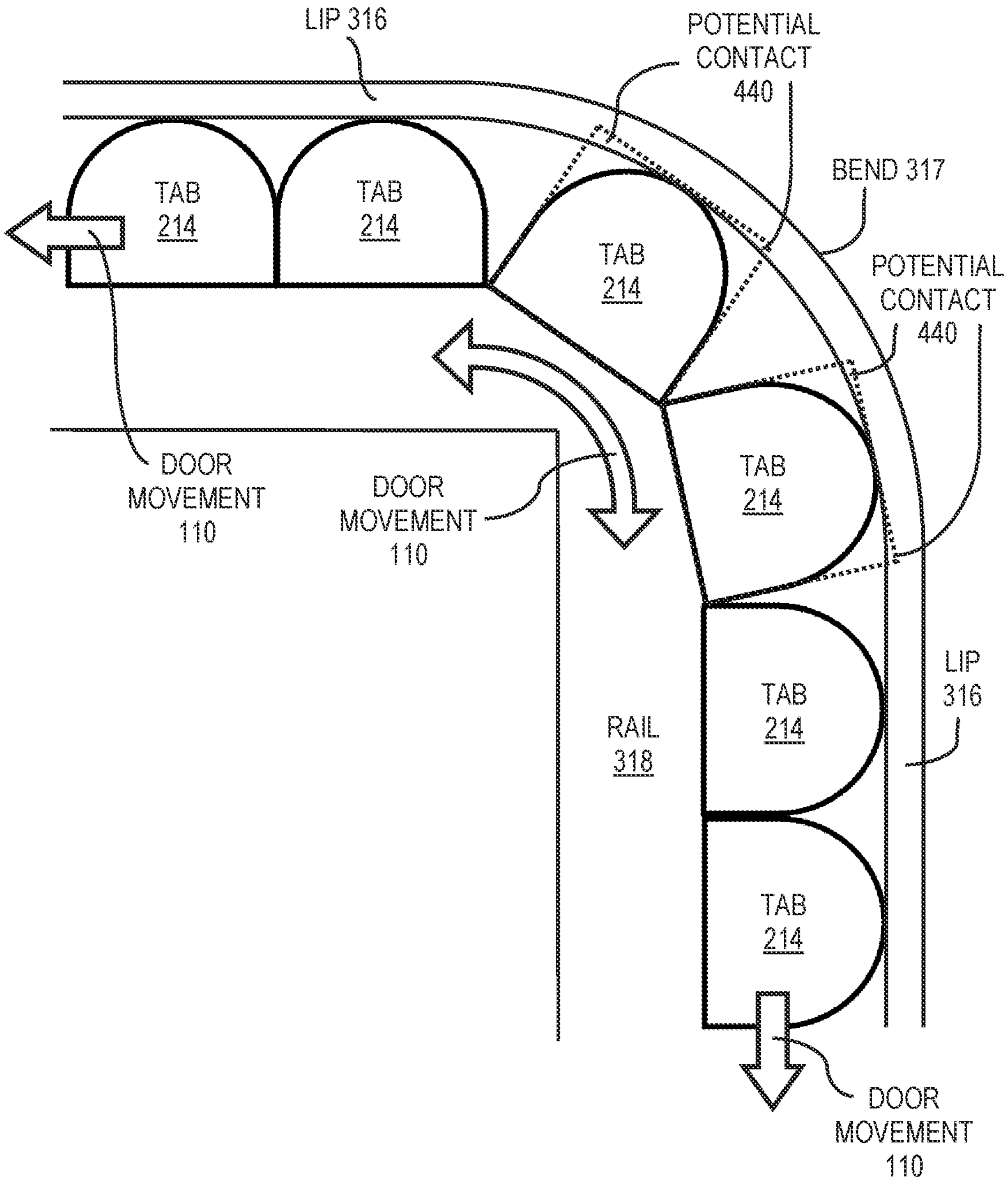
FIG. 4F is a diagram of a top view of tabs on a bend of a track.

FIG. 4A is a diagram of a slat on a track, viewed from the front perspective. FIG. 4B is a diagram of a slat on a track, viewed from a back perspective. FIG. 4C is a diagram of a slat on a track, viewed from a side perspective. FIG. 4D is a diagram of an end slat at a bend of a track. FIG. 4E is a diagram of multiple slats moving around a bend of a track. FIG. 4F is a diagram of a top view of tabs on a bend of a track.

In the examples shown in FIGS. 4A and 4B, an upper portion of standard slat 108S interlocks with a portion of upper track 104U. The downward length of upper tab 214U may be longer than upward length of upper lip 316U. Accordingly, via gravity, the underside of upper tab 214U contacts an upward-facing side of upper rail 318U. To prevent standard slat 108S from falling away from upper track 104U, an outward-facing side of upper tab 214U may contact an inward-facing side of upper lip 316U and prevent movement of standard slat 108S away from upper track 104U. When mounted on upper track 104U, standard slat 108S is free to move laterally in either direction along upper track 104U (i.e., in the directions of door movement 110).

In the example shown in FIG. 4C, a side view is shown of slat 108 mounted on upper track 104U and lower track 104L. Further, upper track 104U and lower track 104L are attached to box 102. To ensure interlocking, upper lip 316U protrudes upward while upper tab 214U protrudes downward. Conversely, to ensure interlocking on the lower portion(s), lower lip 316L protrudes downward while lower tab 214L protrudes upward. Accordingly, lower lip 316L further prevents outward movement of slat 108 via contact with lower tab 214L. That is, although upper lip 316U (alone) may prevent slat 108 from moving away from upper track 104U if moved in a purely outward direction (leftward as shown in FIG. 4C), it may remain possible to rotate slat 108 away from upper track 104U, thereby avoiding contact with upper lip 316U. However, lower lip 316L and lower tab 214L work together to prevent rotation allowing slat 108, thereby preventing slat 108 from disengaging with track(s) 104.

Slat 108 may be constructed with a height such that lower tab 214L does not contact lower rail 318L. In such a setup, slat 108 may only make contact with lower track 104L when rounding bend(s) 317 of track(s) 104 and/or when moved outward with tab(s) 214 pressed against lip(s) 316.

In the example shown in FIG. 4D, when door(s) 106 are in a closed position, end slat 108E may rest in bend 317 of upper track 104U (and lower track 104L, not shown). As tab(s) 214 of end slat 108E do not extend the entire width of end slat 108E, the front-facing surface of end slat 108E may rest parallel to front-facing surface(s) of box 102 and track(s) 104. Accordingly, when viewed from a front perspective, the additional width of end slat 108E (beyond tab(s) 214) blocks the view of the portions of track(s) 104 installed on the side(s) of box 102. Accordingly, end slat(s) 108E may allow for a uniformly flat door 106 that may be disposed laterally adjacent to a door 106 of an adjacent storage unit 100, without exposing track(s) 104 therebetween (e.g., see FIG. 5A). Although the end slat 108E shown in FIG. 4D is for a right door 106R, a person of ordinary skill in the relevant art, provided the benefit of this detailed description, would understand that a mirrored end slat 108E (or the shown end slat inverted vertically) would function similarly on a left door 106L (not shown).

In the example of FIGS. 4E, multiple slats 108 (and tabs 214 thereof) are shown traversing bend 317 of upper track 104U. As door 106 (made of slats 108) undergoes door movement 110, each slat 108 is made to traverse around bend 317 of upper track 104U (as well as lower track 104L, not shown). As door 106 is capable of conforming to bend 317 of track 104, door 106 may be considered “flexible” (even though the individual slats 108 are rigid).

In the example of FIG. 4F, a cutaway top view is shown of tabs 214 moving against lip 316 around bend 317. In one or more embodiments, the rounded surface of tabs 214 helps guide slats 108 through bend 317 of tracks 104, as the smooth and rounded surface of tabs 214 lacks sharp points that are prone to catching on bend 317. That is, without the rounded surface of tabs 214, the otherwise square edges (dotted lines) of tabs 214 may over-constrain the movement of slats 108, thereby greatly increasing friction between tabs 214 and tracks 104, requiring more force to cause door movement 110. FIG. 4F shows the outline of tab 214, without the rounded surface, as dotted lines. Potential contact 440 is the volume(s) of tab 214 that would interfere with door movement 110 if not for the rounded surface of tabs 214. From the depiction, it is clear that the rounded surface of tabs 214 allows for smoother motion when tabs are moving against lip 316.

FIGS. 5A-C

Figure 5A:
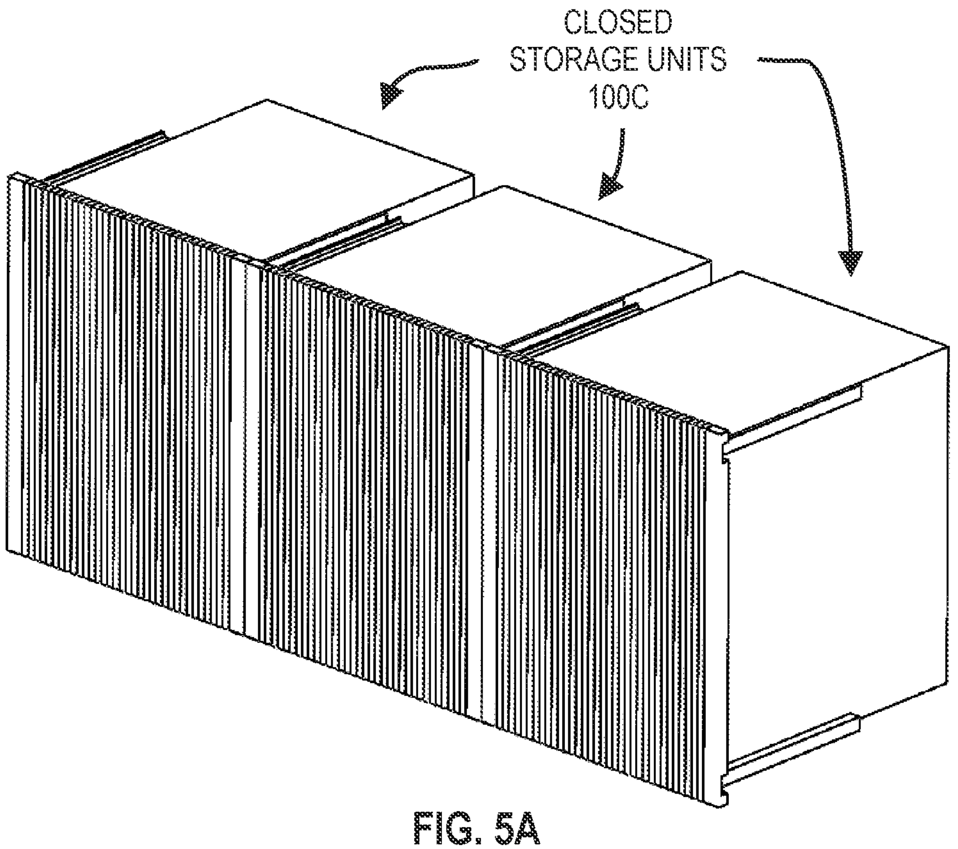
FIG. 5A is a diagram of three closed storage units, arranged side-by-side.
Figure 5B:
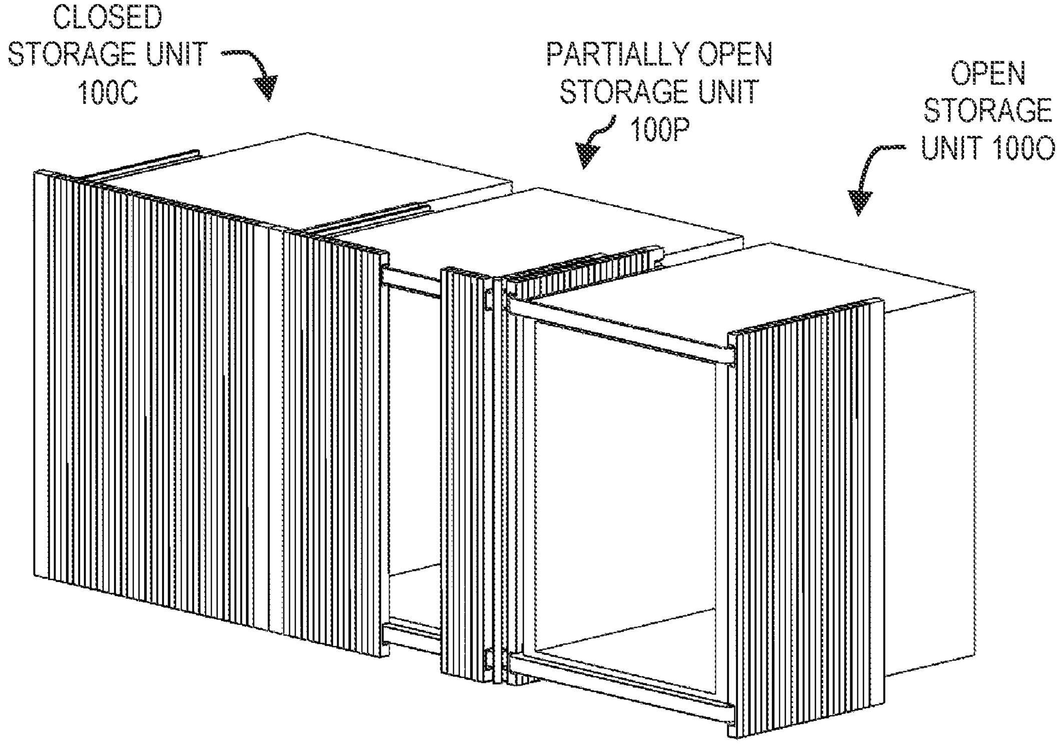
FIG. 5B is a diagram of three storage units, arranged side-by-side.
Figure 5C:
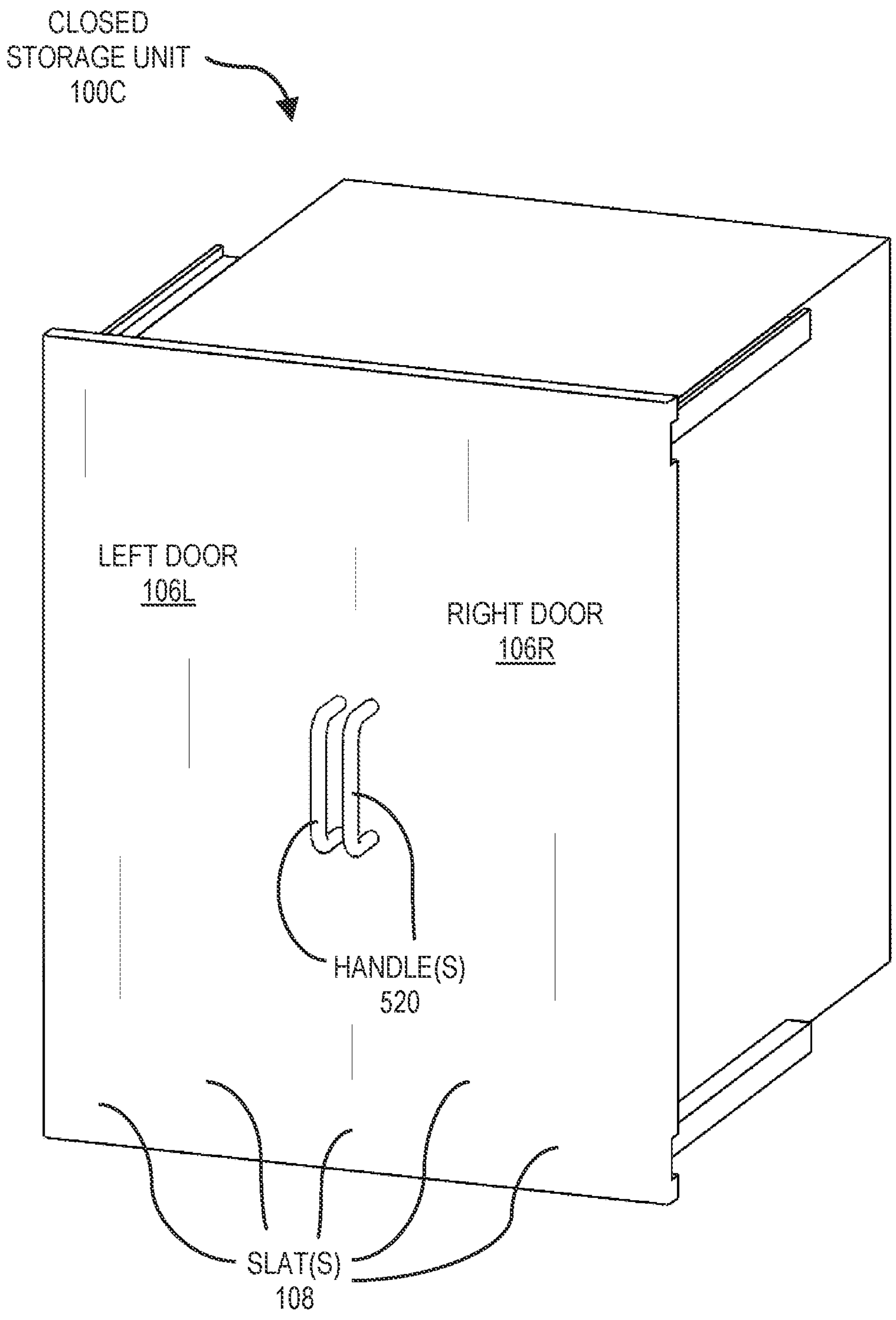
FIG. 5C is a diagram of a storage unit showing a visually uniform door surface.

FIG. 5A is a diagram of three closed storage units, arranged side-by-side. FIG. 5B is a diagram of three storage units, arranged side-by-side. FIG. 5C is a diagram of a storage unit showing a visually uniform door surface.

As shown in the example of FIG. 5A, storage units 100 may be arranged adjacent to each other such that, when closed, end slats 108E may be touching or otherwise have minimal spacing therebetween. Thus, a more uniform flat surface may be formed across multiple closed storage units 100C. As shown in the example of FIG. 5B, doors 106 of different storage units 100 may be opened/closed independently of other storage units 100. Accordingly, there may be a closed storage unit 100C adjacent to a partially open storage unit 100P and/or an open storage unit 1000 (and/or any combination thereof).

Further, as tracks 104 are disposed within cutouts 212 behind doors 106, tracks 104 may be considered “hidden”. Slats 108 may be constructed arbitrarily long to extend above and below the top and bottom surfaces of box 102 (i.e., making the slat height longer than the box height) further obscuring visibility of box 102. Thus, when doors 106 are in a closed position, tracks 104, box 102, any contents of box 102, and cutouts 212 (on the rear of slats 108) may be hidden from view in a front perspective, leaving only doors 106 visible.

Except for FIG. 5C, door(s) 106 are depicted showing the contours of multiple individual slats 108 (i.e., having many vertical lines indicating the edges of each slat 108). However, when assembled, the individual slats 108 may not be as visually perceptible, and door(s) 106 may appear to have a single continuous surface. As shown in FIG. 5C, closed storage unit 100C includes left door 106L and right door 106R, without the contours of each individual slat 108 depicted. Accordingly, FIG. 5C may provide a more accurate illustration of example of door(s) 106.

Due to the smooth and uniform surface of door(s) 106, one or more solid color(s) and/or pattern(s) may be printed on door(s) 106 to provide any visual aesthetic desired by the user. As non-limiting examples, a user may desire to have solid white cabinetry, a faux wood pattern, or use the natural wood pattern of the slats 108.

Further, due to the less cluttered depiction in FIG. 5C, handle(s) 520 are shown on door(s) 106 (one on left door 106L, one on right door 106R). A user of storage unit 100 may use one or more handle(s) 520 to exert lateral force on doors 106 and cause door movement 110.

General Notes

As it is impracticable to disclose every conceivable embodiment of the technology described herein, the figures, examples, and description provided herein disclose only a limited number of potential embodiments. Further, certain technical details, known to those of ordinary skill in the relevant art, may be omitted for brevity and to avoid cluttering the description of the novel aspects. A person of ordinary skill in the relevant art would understand that any number of potential variations or modifications may be made to the explicitly disclosed embodiments, and that such alternative embodiments remain within the scope of the broader technology. Accordingly, the scope should be limited only by the attached claims. Further, machines, structures, compositions, and methods may be described herein using terms such as "comprising", "containing", or "including" various components or steps. Those machines, structures, compositions, and methods may also "consist of" or "consist essentially of" those same components or steps.

For further brevity, descriptions of similarly named components may be omitted if a description of that similarly named component exists elsewhere in the application. Accordingly, any component described with respect to a specific figure may be equivalent to one or more similarly named components shown or described in any other figure, and each component incorporates the description of every similarly named component provided in the application (unless explicitly noted otherwise). A description of any component is to be interpreted as an optional embodiment-which may be implemented in addition to, in conjunction with, or in place of an embodiment of a similarly-named component described for any other figure.

LEXICOGRAPHICAL NOTES

As used herein, adjective ordinal numbers (e.g., first, second, third, etc.) are used to distinguish between elements and do not create any ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, indefinite articles "a" and "an" mean "one or more". That is, the explicit recitation of "an" element does not preclude the existence of a second element, a third element, etc. Further, definite articles (e.g., "the", "said") mean "any one of" (the "one or more" elements) when referring to previously introduced element(s). As an example, there may exist "a processor", where such a recitation does not preclude the existence of any number of other processors. Further, "the processor receives data, and the processor processes data" means "any one of the one or more processors receives data" and "any one of the one or more processors processes data". It is not required that the same processor both (i) receive data and (ii) process data. Rather, each of the steps ("receive" and "process") may be performed by different processors.

What is claimed is:

1. A storage unit, comprising:
a box, comprising:
an exterior front face; and
an opening in the exterior front face;
an upper track mounted on the exterior front face above the opening, wherein the upper track comprises an upper lip;
a lower track mounted on the exterior front face below the opening, wherein the lower track comprises a lower lip; and
a door mounted on the upper track and the lower track, comprising a plurality of slats,
wherein each slat, of the plurality of slats, comprises:
an upper cutout forming an upper tab; and
a lower cutout forming a lower tab, and
wherein each slat is monolithic with its respective upper tab and lower tab.

2. The storage unit of claim 1, wherein a door height of the door is greater than a box height of the box.

3. The storage unit of claim 2, wherein when the door is in a closed position and the storage unit is viewed from a front perspective, the exterior front face and the opening are not visible.

4. The storage unit of claim 3, wherein when the door is in the closed position and the storage unit is viewed from the front perspective, the upper track and the lower track are not visible.

5. The storage unit of claim 4, wherein the upper lip and each upper tab are configured to prevent the door from dismounting from the upper track.

6. The storage unit of claim 5, wherein when a lateral force is applied to the door, the door is configured to undergo a door movement.

7. The storage unit of claim 6, wherein:
the upper tab comprises a rounded surface,
the upper track comprises a bend,
the door is configured to traverse the bend while mounted on the upper track, and
the rounded surface contacts the upper lip while the door is traversing the bend.

8. A storage unit, comprising:
a box, comprising:
an exterior front face; and
an opening in the exterior front face;

an upper track mounted on the exterior front face above the opening, wherein the upper track comprises an upper lip;

a lower track mounted on the exterior front face below the opening, wherein the lower track comprises a lower lip; and a door mounted on the upper track and the lower track, comprising a plurality of slats, wherein each slat, of the plurality of slats, comprises:

an upper cutout forming an upper tab; and a lower cutout forming a lower tab, and wherein a first backside of each slat, a second backside of each upper tab, and a third backside of each lower tab are coplanar for each slat, respectively.

9. The storage unit of claim 8, wherein a door height of the door is greater than a box height of the box.

10. The storage unit of claim 9, wherein when the door is in a closed position and the storage unit is viewed from a front perspective, the exterior front face and the opening are not visible.

11. The storage unit of claim 10, wherein when the door is in the closed position and the storage unit is viewed from the front perspective, the upper track and the lower track are not visible.

12. The storage unit of claim 11, wherein the upper lip and each upper tab are configured to prevent the door from dismounting from the upper track.

13. The storage unit of claim 12, wherein when a lateral force is applied to the door, the door is configured to undergo a door movement.

14. The storage unit of claim 13, wherein:

the upper tab comprises a rounded surface, the upper track comprises a bend, the door is configured to traverse the bend while mounted on the upper track, and the rounded surface contacts the upper lip while the door is traversing the bend.

15. A storage unit, comprising:

a box, comprising:

an exterior front face; and an opening in the exterior front face;

an upper track mounted on the exterior front face above the opening, wherein the upper track comprises an upper lip;

a lower track mounted on the exterior front face below the opening, wherein the lower track comprises a lower lip; and a door mounted on the upper track and the lower track, comprising a plurality of slats, wherein the plurality of slats comprise a plurality of lower tabs, respectively, wherein a lower tab, of the plurality of lower tabs, does not contact the lower lip, wherein a door height of the door is greater than a box height of the box, and wherein when the door is in a closed position and the storage unit is viewed from a front perspective:

the exterior front face and the opening are not visible, and the upper track and the lower track are not visible.

16. The storage unit of claim 15, wherein the upper lip and each upper tab are configured to prevent the door from dismounting from the upper track.

17. The storage unit of claim 16, wherein when a lateral force is applied to the door, the door is configured to undergo a door movement.

18. The storage unit of claim 17, wherein:

the upper tab comprises a rounded surface, and the upper track comprises a bend.

19. The storage unit of claim 18, wherein the door is configured to traverse the bend while mounted on the upper track.

20. The storage unit of claim 19, wherein the rounded surface contacts the upper lip while the door is traversing the bend.

* * * * *